US012073799B2

(12) United States Patent
Lee et al.

(10) Patent No.: US 12,073,799 B2
(45) Date of Patent: Aug. 27, 2024

(54) ELECTRONIC DEVICE AND CONTROL METHOD THEREFOR

(71) Applicant: SAMSUNG ELECTRONICS CO., LTD., Suwon-si (KR)

(72) Inventors: Minhoon Lee, Suwon-si (KR); Gyonyun Kim, Suwon-si (KR); Jungjin Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/237,054

(22) Filed: Aug. 23, 2023

(65) Prior Publication Data

US 2023/0395033 A1 Dec. 7, 2023

Related U.S. Application Data

(63) Continuation of application No. PCT/KR2022/003426, filed on Mar. 11, 2022.

(30) Foreign Application Priority Data

Apr. 28, 2021 (KR) ........................ 10-2021-0055277

(51) Int. Cl.

| | |
|---|---|
| ***G09G 5/10*** | (2006.01) |
| ***G09G 3/20*** | (2006.01) |
| ***G09G 3/34*** | (2006.01) |

(52) U.S. Cl.

CPC ......... *G09G 3/3406* (2013.01); *G09G 3/2007* (2013.01); *G09G 3/2096* (2013.01); *G09G 2310/08* (2013.01); *G09G 2320/0626* (2013.01)

(58) Field of Classification Search

CPC .. G09G 3/2007; G09G 3/2096; G09G 3/3406; G09G 3/3426; G09G 3/3648;

(Continued)

(56) References Cited

U.S. PATENT DOCUMENTS 8,427,419 B2 * 4/2013 Ahn ..................... G09G 3/3426 362/97.1
8,928,701 B2 1/2015 Kim et al.

(Continued)

FOREIGN PATENT DOCUMENTS

KR 10-0798111 1/2008
KR 10-2011-0083824 7/2011

(Continued)

OTHER PUBLICATIONS

PCT/ISA/210 dated Jul. 1, 2022 in International Patent Application No. PCT/KR/2022/003426.

(Continued)

*Primary Examiner* — Joe H Cheng
(74) *Attorney, Agent, or Firm* — STAAS & HALSEY LLP

(57) ABSTRACT

An electronic device comprises: a memory to store an image input; a backlight unit; a driving unit to output a driving current to the backlight unit; and a processor to identify, based on a grayscale value of the image, a first intensity of the driving current corresponding to one from among a plurality of time sections of a backlight dimming section, obtaining, based on the identified first intensity, a first control value that allows control of an intensity of the driving current, providing a second control value, which is greater than a first control value to the driving unit, that allows the driving unit to output a driving current of a second intensity that is greater than the first intensity, and provide the first control value to the driving unit that allows the driving unit to output the driving current of the first intensity during the one time section.

15 Claims, 9 Drawing Sheets

(58) Field of Classification Search
CPC ............ G09G 5/10; G09G 2310/0237; G09G 2310/067; G09G 2310/08; G09G 2320/0238; G09G 2320/0626; G09G 2320/0633; G09G 2320/064; G09G 2360/16; H05B 45/10
See application file for complete search history.

(56) References Cited

U.S. PATENT DOCUMENTS

| | | | | |
|---|---|---|---|---|
| 9,125,276 | B2 | 9/2015 | Lee | |
| 9,269,305 | B2 | 2/2016 | Hussain et al. | |
| 9,478,175 | B2 | 10/2016 | Lim | |
| 10,785,842 | B1 | 9/2020 | Jeong | |
| 11,132,958 | B2 | 9/2021 | Lee et al. | |
| 11,132,959 | B2 * | 9/2021 | Lee | G09G 3/342 |
| 11,176,877 | B2 | 11/2021 | Lee et al. | |
| 11,587,517 | B2 * | 2/2023 | Lee | G09G 3/3426 |
| 11,682,358 | B2 * | 6/2023 | Lee | G09G 3/3607 345/596 |
| 2003/0107536 | A1 | 6/2003 | Ishizuka et al. | |
| 2004/0183773 | A1 | 9/2004 | Song | |
| 2009/0109165 | A1 * | 4/2009 | Park | G09G 3/3426 345/589 |
| 2011/0279749 | A1 * | 11/2011 | Erinjippurath | H04N 13/324 345/32 |
| 2012/0098738 | A1 | 4/2012 | Yoshida et al. | |
| 2016/0140912 | A1 | 5/2016 | Im et al. | |
| 2017/0116898 | A1 | 4/2017 | Choi et al. | |
| 2018/0182306 | A1 * | 6/2018 | Seong | G09G 3/36 |
| 2021/0020114 | A1 * | 1/2021 | Lee | G09G 3/342 |
| 2023/0230527 | A1 * | 7/2023 | Chung | G09G 3/342 345/699 |
| 2024/0021166 | A1 * | 1/2024 | Kim | G09G 3/2018 |

FOREIGN PATENT DOCUMENTS

| | | |
|---|---|---|
| KR | 10-2012-0102411 | 9/2012 |
| KR | 10-1587603 | 1/2016 |
| KR | 10-2019-0090673 | 8/2019 |
| KR | 10-2126534 | 6/2020 |
| KR | 10-2021-0025952 | 3/2021 |
| KR | 10-2479070 | 12/2022 |
| KR | 10-1310311 | 9/2023 |

OTHER PUBLICATIONS

PCT/ISA/237 dated Jul. 1, 2022 in International Patent Application No. PCT/KR2022/003426.

Extended European Search Report dated May 27, 2024 for corresponding application No. 22795954.1.

* cited by examiner

ELECTRONIC DEVICE AND CONTROL METHOD THEREFOR

CROSS-REFERENCE TO RELATED APPLICATION(S)

This application is a continuation application, under 35 U.S.C. § 111(a), of international application No. PCT/KR2022/003426, filed on Mar. 11, 2022, which claims priority under 35 U. S. C. § 119 to Korean Patent Application No. 10-2021-0055277, filed on Apr. 28, 2021, the disclosures of which are incorporated herein by reference in their entireties.

BACKGROUND

Field

The disclosure relates to an electronic device and a control method therefor, and more particularly, to an electronic device driving a backlight unit, and a control method therefor.

Description of the Related Art

Recently, with the development of electronic technologies, image quality of display devices is becoming further improved. In particular, in the case of driving a backlight unit by an active matrix (AM) method, gates are sequentially turned on/off, and source data is held on a time point when a gate is turned off (closed), and the source data is maintained until a gate signal on the same location is input afterwards.

Here, in a process wherein gate signals are sequentially applied, a problem that influence is exerted by the data corresponding to the previous gate may occur. Specifically, data is held on a time point when a gate is turned off, but data on a time point when the gate is turned on (opened) afterwards is taken, and influence is exerted on converging to a value corresponding to the desired brightness. That is, as there is insufficient time for reaching the desired value, the value on the time point when the gate is turned off may not reach the desired value. This means that the value of the previous data exerts influence on the brightness of the current LED, and thus the desired light amount cannot be expressed.

FIG. 1 illustrates a problem that influence is exerted by the value of the previous data in a process wherein the previous gate is turned off and the next gate is turned on, and there is a need that a method for resolving the problem is developed.

SUMMARY

According to one or more embodiments of the disclosure, an electronic device includes a memory configured to store an image that is input, a backlight unit, a driving part configured to output a driving current to the backlight unit, and a processor configured to identify a first intensity of a driving current corresponding to one time section among a plurality of time sections of a backlight dimming section based on a grayscale value of the image input, obtain a first control value that allows control of an intensity of the driving current based on the identified first intensity, and provide a second control value, which is greater than the first control value to the driving part, that allows the driving part to output a driving current of a second intensity greater than the first intensity and provide the first control value to the driving part that allows the driving part to output the driving current of the first intensity during the one time section among the plurality of time sections of the backlight dimming section.

Also, the processor may obtain the second control value by applying a predetermined ratio to the first control value.

In addition, the processor may, based on the identified first intensity being smaller than a threshold value, control the driving part based on the first control value and the second control value, and based on the identified first intensity being greater than or equal to the threshold value, control the driving part based on the first control value.

Further, the processor may identify the first intensity corresponding to the one time section based on at least one second bit which remains subsequent to excluding a plurality of first bits among a plurality of bits indicating the grayscale value of the image.

Also, the processor may identify a time section to which a driving current is to be applied among the plurality of time sections based on the plurality of first bit values, and a number of the plurality of time sections may be determined based on a number of the plurality of first bits.

In addition, the processor may identify the plurality of first bits based on degrees of the plurality of first bits, respectively.

Further, the processor may, based on a driving current not being applied in a previous time section of the one time section and the first intensity of the driving current corresponding to the one time section being smaller than the threshold value, control the driving part based on the first control value and the second control value.

Also, the processor may include a timing controller (TCON) configured to output the first control value and the second control value based on the grayscale value of the image, and the driving part may include a driver IC configured to output the driving current in an analog form based on the first control value and the second control value and a pixel IC configured to amplify the driving current output from the driver IC, and output the amplified driving current to the backlight unit.

In addition, the pixel IC may output the amplified driving current in a held state.

Further, the driver IC may provide the second control value to the pixel IC, and output a gate control signal to the pixel IC before providing the first control value to the pixel IC.

Meanwhile, according to one or more embodiments of the disclosure, a control method for an electronic device includes identifying a first intensity of a driving current corresponding to one time section among a plurality of time sections of a backlight dimming section based on a grayscale value of an image that is input, obtaining a first control value that allows control of an intensity of the driving current based on the identified first intensity, and providing a second control value, which is greater than the first control value, to a driving part, that allows the driving part configured to output a driving current to a backlight unit of the electronic device, output a driving current of a second intensity greater than the first intensity and provide the first control value to the driving part so that the driving part outputs the driving current of the first intensity during the one time section among the plurality of time sections of the backlight dimming section.

Also, in the obtaining, the second control value may be obtained by applying a predetermined ratio to the first control value.

In addition, in the providing, based on the identified first intensity being smaller than a threshold value, the driving part may be controlled based on the first control value and the second control value, and based on the identified first intensity being greater than or equal to the threshold value, the driving part may be controlled based on the first control value.

Further, in the identifying, the first intensity corresponding to the one time section may be identified based on at least one second bit which remains subsequent to excluding a plurality of first bits among a plurality of bits indicating the grayscale value of the image.

Also, in the identifying, a time section to which a driving current is to be applied may be identified among the plurality of time sections based on the plurality of first bit values, and a number of the plurality of time sections may be determined based on a number of the plurality of first bits.

In addition, in the identifying, the plurality of first bits may be identified based on degrees of the plurality of bits, respectively.

Further, in the providing, based on a driving current not being applied in a previous time section of the one time section and the first intensity of the driving current corresponding to the one time section being smaller than the threshold value, the driving part may be controlled based on the first control value and the second control value.

Also, the providing may include a timing controller (TCON) outputting the first control value and the second control value based on the grayscale value of the image, a driver IC outputting the driving current in an analog form based on the first control value and the second control value, and a pixel IC amplifying the driving current output from the driver IC, and outputting the amplified driving current to the backlight unit.

In addition, in the outputting to the backlight unit, the amplified driving current may be output in a held state.

Further, the control method may further include the providing the second control value to the pixel IC, and outputting a gate control signal to the pixel IC before providing the first control value to the pixel IC.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
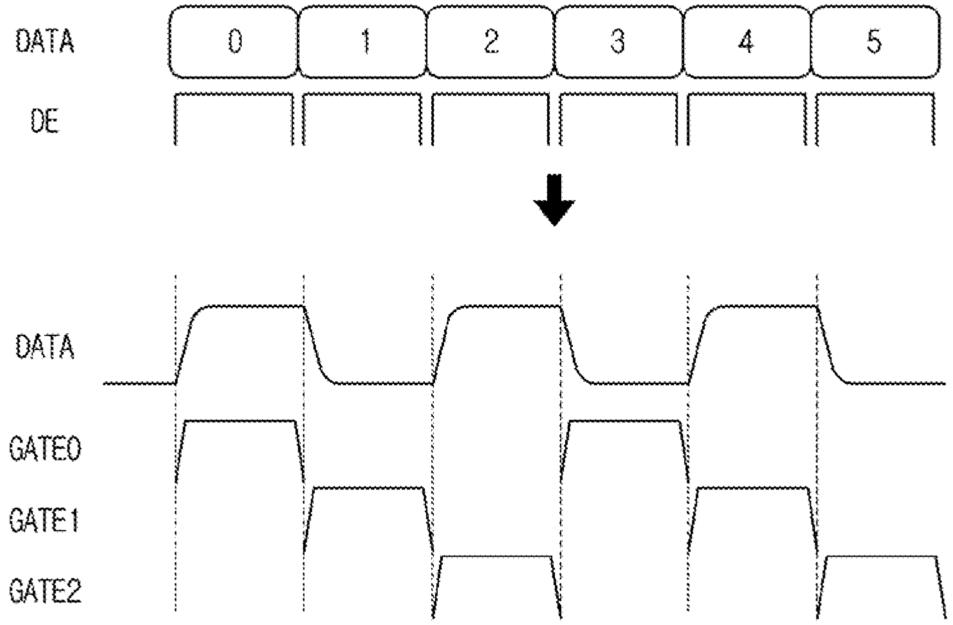
FIG. 1 is a diagram for illustrating the conventional technology.

Hereinafter, the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies, etc. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as “have,” “may have,” “include,” and “may include” denote the existence of such characteristics (e.g.: elements such as numbers, functions, operations, and components), and do not exclude the existence of additional characteristics.

In addition, the expression “at least one of A and/or B” should be interpreted to mean any one of “A” or “B” or “A and B.”

Further, the expressions “first,” “second,” and the like used in this specification may be used to describe various elements regardless of any order and/or degree of importance. Also, such expressions are used only to distinguish one element from another element, and are not intended to limit the elements.

In addition, singular expressions include plural expressions, as long as they do not obviously mean differently in the context. Also, in the disclosure, terms such as “include” and “consist of” should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, in this specification, the term “user” may refer to a person who uses an electronic device or a device using an electronic device (e.g.: an artificial intelligence electronic device).

The disclosure is for addressing the aforementioned need, and the purpose of the disclosure is in providing an electronic device for precisely controlling a backlight unit to the desired brightness, and a control method therefor.

According to the various embodiments of the disclosure, an electronic device can reduce the time for the backlight unit to reach the target brightness by applying the intensity of a driving current more strongly.

Also, as the time for the backlight unit to reach the target brightness is reduced, brightness according to PAM control can be distinguished more clearly.

Hereinafter, various embodiments of the disclosure will be described in more detail with reference to the accompanying drawings.

Figure 2:
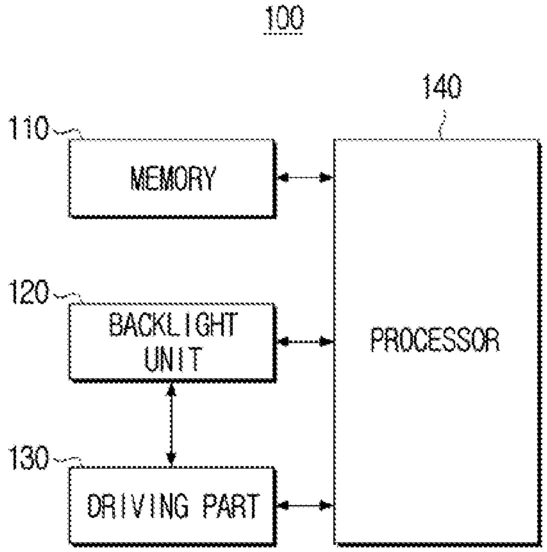
FIG. 2 is a block diagram illustrating a configuration of an electronic device according to one or more embodiments of the disclosure.

FIG. 2 is a block diagram illustrating a configuration of an electronic device 100 according to one or more embodiments of the disclosure.

The electronic device 100 is a device that controls a backlight unit 120, and it may be a device that includes a display panel such as a TV, a desktop PC, a laptop computer, a video wall, a large format display (LFD), digital signage, a digital information display (DID), a projector display, a digital video disk (DVD) player, a smartphone, a tablet PC, a monitor, smart glasses, a smart watch, etc., and directly displays an obtained graphic image.

However, the disclosure is not limited thereto, and the electronic device 100 may also be implemented as a device that is attached to/detached from a display panel, and it can be any device if it is a device that can control the backlight unit 120.

As illustrated in FIG. 2, the electronic device 100 includes a memory 110, a backlight unit 120, a driving part 130, and a processor 140.

The memory 110 may refer to hardware that stores information such as data, etc. in an electronic or a magnetic form so that the processor 140, etc. can access the data. For example, the memory 110 may be implemented as at least one hardware among a non-volatile memory, a volatile memory, a flash memory, a hard disk drive (HDD) or a solid state drive (SSD), a RAM, a ROM, etc.

In the memory 110, at least one instruction or a module necessary for the operations of the electronic device 100 or the processor 140 may be stored. Here, an instruction is a code unit instructing the operations of the electronic device 100 or the processor 140, and it may have been drafted in a machine language that can be understood by a computer. Also, the module may be a set of a series of instructions (an instruction set) performing a specific task in a task unit.

Also, in the memory 110, data which is information in bit or byte units that can indicate characters, numbers, images, etc. may be stored. For example, in the memory 110, information on an input image may be stored.

The memory 110 may be accessed by the processor 140, and reading/recording/correction/deletion/update, etc. for an instruction, a module, or data may be performed by the processor 140.

The backlight unit 120 is a component that generates light and provides the light to the display panel. For this, the backlight unit 120 may include one or more light emitting elements (not shown), and it may also be arranged on the rear surface of the display panel so that the display panel can display an image, and irradiate light on the display panel.

The light emitting elements (not shown) are a light source, and may emit light. Also, the light emitting elements (not shown) may be implemented as light emitting diodes (LED), and receive a current output by the driving part 130, and emit light.

The driving part 130 may output a driving current to the backlight unit 120 according to control by the processor 140. For example, a driving current may be a form wherein a pulse width modulation (PWM) form and a pulse amplitude modulation (PAM) form are combined. However, the disclosure is not limited thereto, and the form of a driving current may be any various forms.

The processor 140 controls the overall operations of the electronic device 100. Specifically, the processor 140 may be connected with each component of the electronic device 100, and control the overall operations of the electronic device 100. For example, the processor 140 may be connected with components such as the memory 110, the backlight unit 120, the driving part 130, etc., and control the operations of the electronic device 100.

According to one or more embodiments, the processor 140 may be implemented as a digital signal processor (DSP), a microprocessor, and a timing controller (TCON). However, the disclosure is not limited thereto, and the processor 140 may include one or more of a central processing unit (CPU), a micro controller unit (MCU), a micro processing unit (MPU), a controller, an application processor (AP), or a communication processor (CP), and an ARM processor, or may be defined by the terms. Also, the processor 140 may be implemented as a system on chip (SoC) having a processing algorithm stored therein or large scale integration (LSI), or implemented in the form of a field programmable gate array (FPGA).

The processor 140 may identify a first intensity of a driving current corresponding to one time section among a plurality of time sections of a backlight dimming section based on a grayscale value of an input image. For example, the processor 140 may divide the backlight dimming section into eight time sections based on a grayscale value of an input image, and control seven time sections by a pulse width modulation (PWM) method, and control one time section by a pulse amplitude modulation (PAM) method.

Also, the processor 140 may obtain a first control value for controlling the intensity of the driving current based on the identified first intensity, and provide a second control value greater than the first control value to the driving part 130 so that the driving part 130 outputs a driving current of a second intensity greater than the first intensity and then provide the first control value to the driving part 130 so that the driving part 130 outputs the driving current of the first intensity during the one time section.

According to the conventional technology, the driving part 130 was controlled with one control value during one time section, but according to the disclosure, the driving part 130 may be controlled with two control values during one time section. Also, according to the conventional technology, the driving part 130 was controlled only with the first control value, but according to the disclosure, the driving part 130 is controlled by additionally using the second control value greater than the first control value, and thus the time for the backlight unit 120 to reach the target brightness can be reduced.

Meanwhile, the processor 140 may obtain the second control value by applying a predetermined ratio to the first control value. For example, the processor 140 may obtain a value which is 1.1 times of the first control value as the second control value. However, the disclosure is not limited thereto, and the processor 140 may obtain the second control value by any different methods. For example, the processor 140 may obtain the second control value by adding a predetermined value to the first control value. Alternatively, the processor 140 may obtain a different ratio based on the first control value, and obtain the second control value by applying the obtained ratio to the first control value. For example, if the intensity of the driving current is greater than or equal to a first threshold value and smaller than a second threshold value, the processor 140 may set the ratio based on the first control value as 1, and in this case, the second control value may be identical to the first control value. Also, if the intensity of the driving current is greater than or equal to the second threshold value, the processor 140 may set the ratio based on the first control value as 1.2.

If the identified first intensity is smaller than the threshold value, the processor 140 may control the driving part 130 based on the first control value and the second control value, and if the identified first intensity is greater than or equal to the threshold value, the processor 140 may control the driving part 130 based on the first control value. This is because the time for the backlight unit 120 to reach the target brightness may not be insufficient if the intensity of the driving current is greater than or equal to the threshold value.

Meanwhile, the processor 140 may identify the first intensity corresponding to one time section based on at least one second bit which is the remaining one excluding a plurality of first bits among a plurality of bits indicating a grayscale value of an input image.

Also, the processor 140 may identify a time section to which the driving current will be applied among the plurality of time sections based on the plurality of first bit values, and the number of the plurality of time sections may be determined based on the number of the plurality of first bits.

For example, in case a grayscale value of an input image is expressed as five bits, the processor 140 may use three bits among the five bits as the first bit. The processor 140 may identify a time section to which the current will be applied among the plurality of time sections based on the value of the first bit. Then, the processor 140 may identify two bits which are the remaining ones among the five bits as the second bit, and control the driving part 130 to change the intensity of the current of one time section among the plurality of time sections based on the remaining two bits. Here, the number of the plurality of time sections may be the multiplier of the number of the plurality of first bits regarding two. For example, the number of the plurality of time sections may be eight which is two to the power of three. That is, the processor 140 may identify the time section to which the current will flow based on the value of three bits during eight time sections. However, the disclosure is not limited thereto, and the number of bits for a grayscale value of an input image, the number of the first bits, and the number of the second bits may be any different numbers.

The processor 140 may identify a plurality of first bits based on the degrees of the plurality of respective bits. In the aforementioned example, in case the grayscale value of the input image is binary data (a binary number) such as 11100, the processor 140 may identify 111 having the higher degree as the first bit, and identify 00 having the lower degree as the second bit.

If a driving current is not applied in the previous time section of one time section, and the first intensity of a driving current corresponding to the one time section is smaller than the threshold value, the processor 140 may control the driving part 130 based on the first control value and the second control value. In this case, the driving current should fill the capacitance of the load, and thus the time for the backlight unit 120 to reach the target brightness may be insufficient, and for preventing this, the processor 140 may control the driving part 130 based on the first control value and the second control value. Here, the load may include load components existing in the wiring of the backlight unit 120, etc.

Meanwhile, the processor 140 may include a timing controller (TCON) outputting the first control value and the second control value based on a grayscale value of an input image, and the driving part 130 may include a driver IC outputting a driving current in an analog form based on the first control value and the second value, and a pixel IC amplifying the driving current output from the driver IC, and outputting the amplified driving current to the backlight unit 120. Here, the pixel IC may output the amplified driving current in a held state.

The driver IC may provide the second control value to the pixel IC, and then output a gate control signal to the pixel IC before providing the first control value to the pixel IC. Through such an operation, the capacitance of the load may be filled first, and afterwards, the backlight unit 120 may reach the target brightness according to the gate control signal.

However, the disclosure is not limited thereto, and the timing controller may be included in the driving part 130, and it may also be implemented as one hardware with the timing controller of the display panel.

As described above, the processor 140 may control the driving part 130 based on the second control value for controlling the driving part 130 to output a driving current of the second intensity greater than the first intensity, and the first control value for controlling the driving part 130 to output a driving current of the first intensity, and accordingly, the time for the backlight unit 120 to reach the target brightness can be reduced.

Meanwhile, in the above, it was assumed that a grayscale value of an input image is five bits, but a grayscale value may be implemented in any different bit numbers. Also, in the above, it was described that three bits among five bits of a grayscale value of an input image are the first bit and two bits are the second bit, but this can also be modified in any various ways according to the specification required in implementing the electronic device 100.

Meanwhile, in the above, it was described that the driving part 130 is controlled based on the first control value and the second control value, but the disclosure is not limited thereto. For example, the processor 140 may control the driving part 130 based on three or more control values. Here, the processor 140 may determine the number of control values based on the degree of change of a grayscale value of an input image.

Hereinafter, operations of the electronic device 100 will be described in more detail through FIG. 3 to FIG. 8. In FIG. 3 to FIG. 8, individual embodiments will be described for the convenience of explanation. However, the individual embodiments in FIG. 3 to FIG. 8 can be carried out in any combined states.

Figure 3:
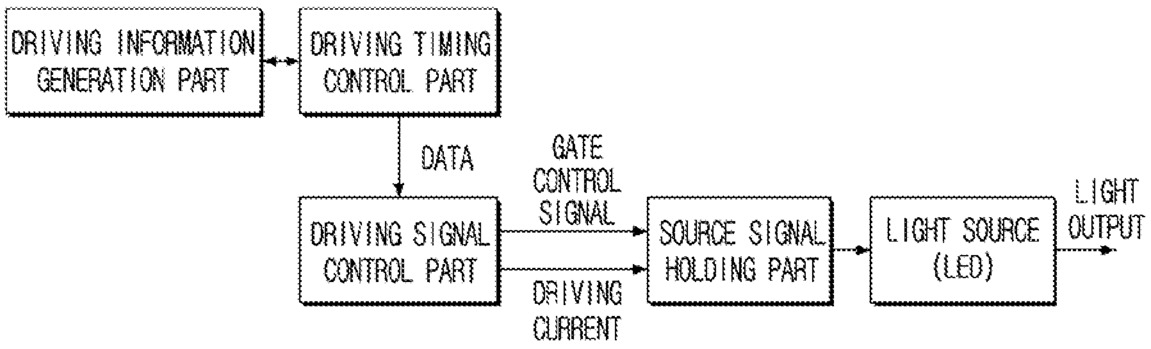
FIG. 3 is a block diagram for illustrating in detail a configuration of an electronic device according to one or more embodiments of the disclosure.

FIG. 3 is a block diagram for illustrating in detail a configuration of the electronic device 100 according to one or more embodiments of the disclosure.

The processor 140 may include a driving information generation part and a driving timing control part (a timing controller, TCON). The driving information generation part may generate driving information for controlling the driving part 130 based on a grayscale value of an input image, and the driving timing control part may output digital data for controlling the driving part 130 based on the driving information. The driving information generation part and the driving timing control part may be implemented as a field programmable gate array (FPGA).

The driving timing control part according to the disclosure may output digital data a plurality of times during one time section. For example, the driving timing control part may output digital data two or more times during one time that is PAM-controlled among the plurality of time sections included in one backlight dimming section. Here, the size of the digital data may be different.

The driving signal control part may also be referred to as a driver IC, and it may provide a gate control signal and a driving current to the source signal holding part. Here, each of the plurality of driver ICs may output a driving current in an analog form corresponding to each of the plurality of pixel ICs based on the digital data.

In particular, a driving current that is output after the second control value greater than the first control value and the first control value are sequentially received may have faster increasing speed than a driving current that is output after the first control value is received. That is, the time for the backlight unit 120 to reach the target brightness is reduced.

Then, the driving signal control part may provide the second control value to the source signal holding part, and then output a gate control signal to the source signal holding part before providing the first control value to the source signal holding part. Through such an operation, the capacitance of the load may be charged first.

The source signal holding part may also be referred to as a pixel IC, and it may amplify a driving current output from the corresponding driver IC, and output the amplified driving current to the backlight unit (a light source (LED)) 120. Also, the source signal holding part may output the amplified driving current in a held state.

Figure 4:
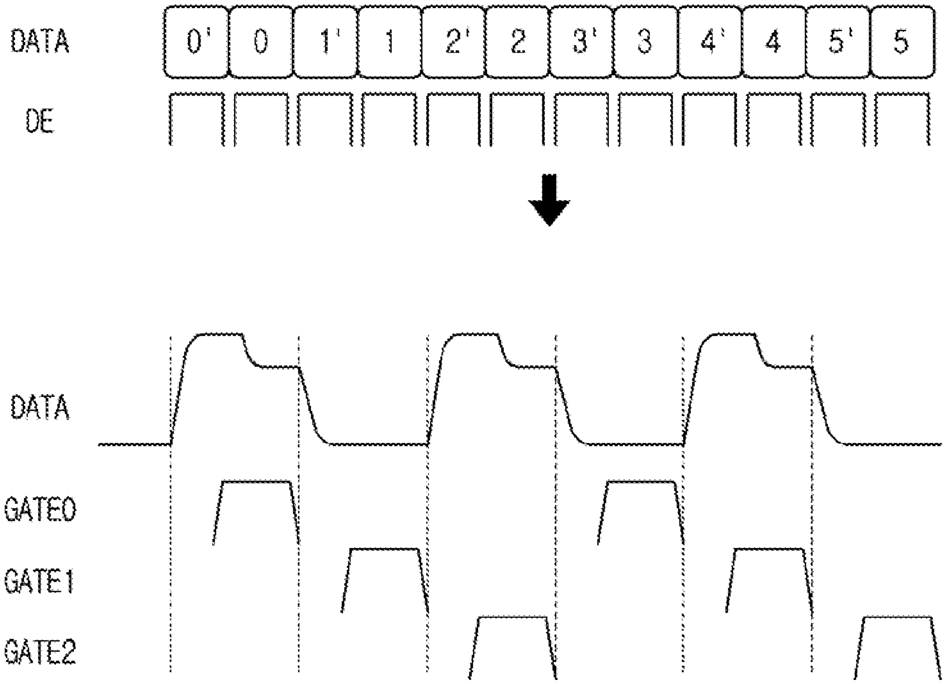
FIG. 4 is a timing diagram for illustrating an operation of a processor according to one or more embodiments of the disclosure.

FIG. 4 is a timing diagram for illustrating an operation of the processor 140 according to one or more embodiments of the disclosure.

First, the data in the upper part indicates digital data for controlling the intensity of a driving current, and DE is a data enable signal. In each number of the data, the prime was added to indicate a greater number. For example, 0' indicates a value greater than 0.

The data in the lower part indicates digital data in a waveform, and the space between vertical dotted lines indicates one time section. That is, the processor 140 may first output the second control value greater than the first control value to the driving part 130 during one time section, and output the first control value later.

A gate control signal may be output as the first control value is output. That is, the load may be charged first while the second control value is being output, and accordingly, the time for the backlight unit to reach the target brightness can be secured.

Figure 5:
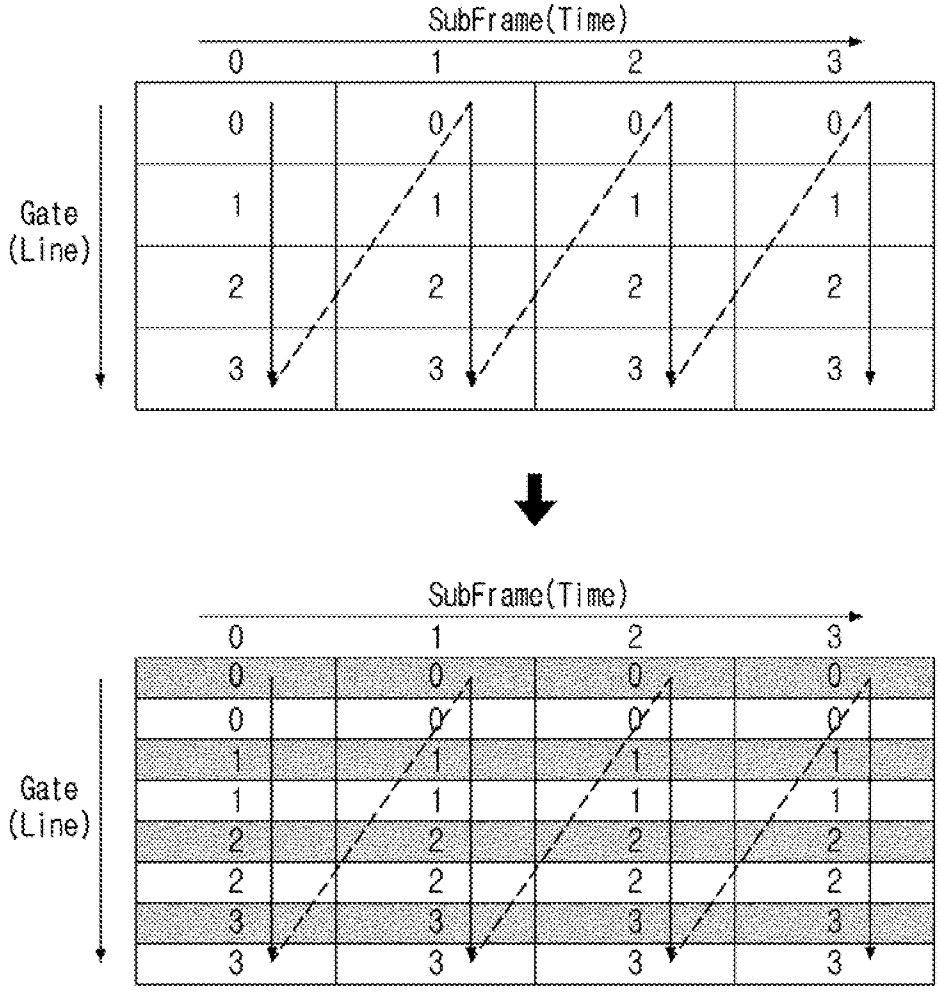
FIG. 5 is a diagram for comparing a driving order according to one or more embodiments of the disclosure with the conventional driving order.

FIG. 5 is a diagram for comparing a driving order according to one or more embodiments of the disclosure with the conventional driving order. In FIG. 5, it was assumed that the backlight dimming section is divided into four time sections, for the convenience of explanation.

First, according to the conventional technology, gate control was performed from the upper end to the lower end of the first column from the left side, and then gate control was performed from the upper end to the lower end of the second column. Such an operation order is also identical in the disclosure.

However, according to the disclosure, the processor 140 may output two pieces of digital data during one time section. For example, the processor 140 may output the same digital data twice in the case of performing PWM control in the time sections 0, 1, and 2, and output different digital data twice in the case of performing PAM control in the time section 3. Through such an operation, the problem that the time needed until the time when the data is held after gate control is performed is insufficient can be resolved.

Figure 6:
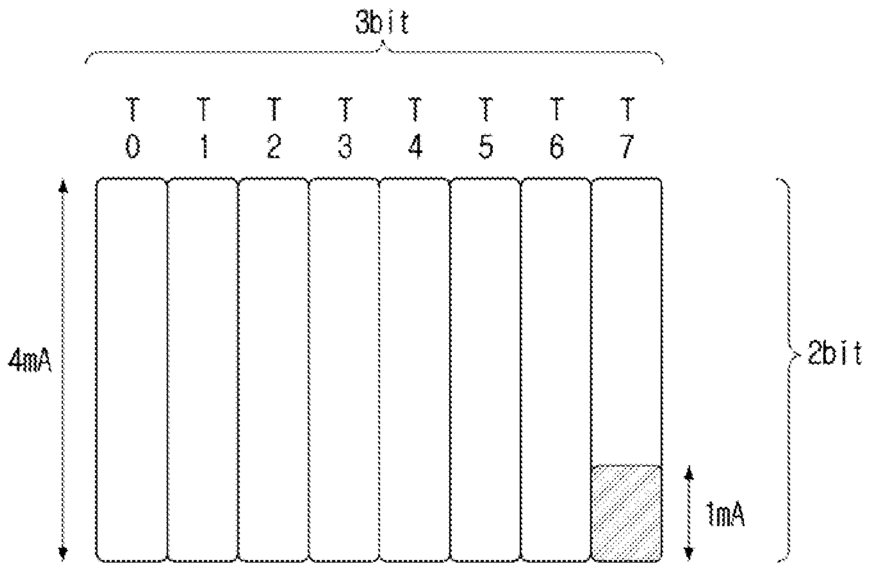
FIG. 6 is a diagram for illustrating PWM and PAM driving according to one or more embodiments of the disclosure.

FIG. 6 is a diagram for illustrating PWM and PAM driving according to one or more embodiments of the disclosure. In FIG. 6, it was assumed that a grayscale value of an input image is five bits, and the three upper bits are the first bit, and the two lower bits are the second bit, for the convenience of explanation. Also, it was assumed that the current of the first intensity is 4 mA.

FIG. 6 is a case wherein a grayscale value of an input image is binary data (a binary number) such as 00000, and the processor 140 may control the driving part 130 to not apply a current during the time sections 0-6 based on the upper bits 000, and output a current of 1 mA during the time section 7 based on the lower bits 00.

The processor 140 may sequentially output the second control value greater than the first control value corresponding to the current of 1 mA and the first control value to the driving part 130, in order to control the driving part 130 to output a current of 1 mA during the time section 7.

The processor 140 may obtain the second control value based on the intensity of a current. For example, if the intensity of a current is smaller than or equal to 1 mA, the processor 140 may obtain a value which is 1.1 times of the first control value as the second control value, and if the intensity of a current is greater than or equal to 2 mA, the processor 140 may obtain a value which is 1.05 times of the first control value as the second control value. Alternatively, if the intensity of a current is smaller than or equal to 1 mA, the processor 140 may obtain a value which is 1.1 times of the first control value as the second control value, and if the intensity of a current is greater than or equal to 2 mA, the processor 140 may obtain a value which is identical to the first control value as the second control value.

Also, the processor 140 may use a plurality of control values based on the intensity of a current. For example, if the intensity of a current is smaller than or equal to 1 mA, the processor 140 may sequentially output the second control value greater than the first control value, the third control value between the first control value and the second control value, and the first control value to the driving part 130, and if the intensity of a current is greater than or equal to 2 mA, the processor 140 may sequentially output the second control value greater than the first control value, and the first control value to the driving part 130.

Further, if a driving current is not applied in the previous time section of one time section, and the intensity of a driving current corresponding to the one time section is smaller than the threshold value, the processor 140 may control the driving part 130 based on the first control value and the second control value.

For example, in case the processor 140 controls the driving part 130 to not output a driving current during the time section 6, and output a current of 1 mA during the time section 7, the processor 140 may control the driving part 130 based on the first control value and the second control value. In contrast, in case the processor 140 controls the driving part 130 to output a driving current of 4 mA during the time section 6, and output a current of 1 mA during the time section 7, the processor 140 may not use the second control value. In this case, the processor 140 may output the first control value to the driving part 130 twice.

Figure 7:
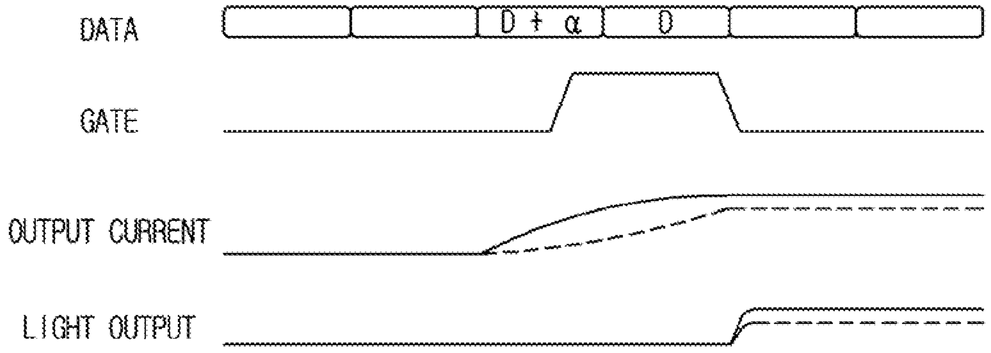
FIG. 7 and FIG. 8 are diagrams for illustrating a waveform of a driving current according to one or more embodiments of the disclosure.
Figure 8:
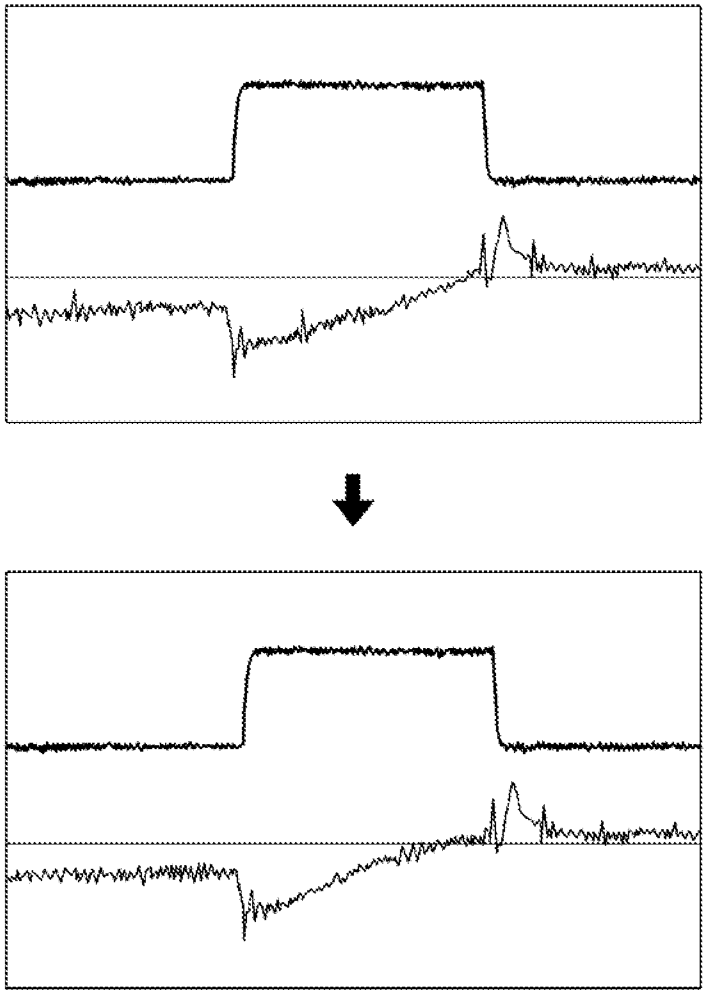

FIG. 7 and FIG. 8 are diagrams for illustrating a waveform of a driving current according to one or more embodiments of the disclosure.

As illustrated in FIG. 7, if digital data corresponding to a grayscale value of an input image is D, D+α and D may be sequentially provided to the driving part 130. In case D+α and D are sequentially provided to the driving part 130, the driving current (the output current) may be like the solid line, and the time for reaching a target current value is reduced more than a driving current in a case wherein only D is provided to the driving part 130 as the conventional dotted line.

Accordingly, light output is also held at a higher value like the solid line in the disclosure than the conventional dotted line, and more correct brightness can be output.

FIG. 8 is a diagram illustrating a waveform of an actual driving current, and the driving current according to the disclosure on the lower end can reach a target current value faster than the conventional driving current on the upper end.

Figure 9:
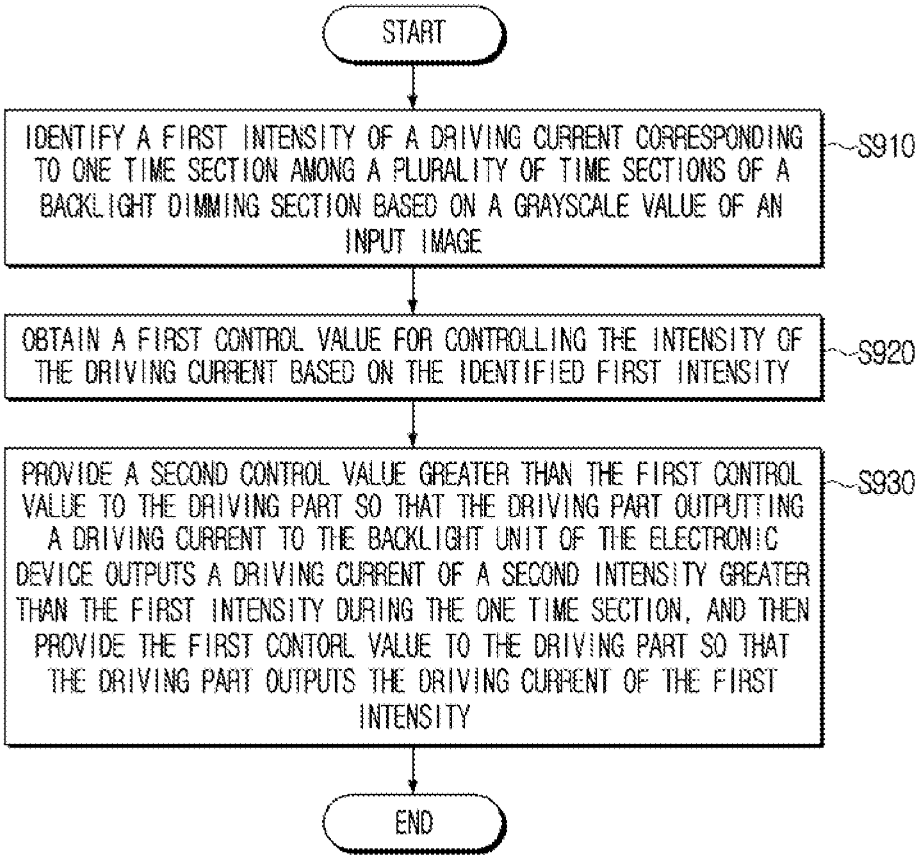
FIG. 9 is a flow chart for illustrating a control method for an electronic device according to one or more embodiments of the disclosure.

FIG. 9 is a flow chart for illustrating a control method for an electronic device according to one or more embodiments of the disclosure.

First, a first intensity of a driving current corresponding to one time section among a plurality of time sections of a backlight dimming section is identified based on a grayscale value of an input image in operation S910. Then, a first control value for controlling the intensity of the driving current is obtained based on the identified first intensity in operation S920. Then, a second control value greater than the first control value is provided to the driving part so that the driving part outputting a driving current to the backlight unit of the electronic device outputs a driving current of a second intensity greater than the first intensity and then the first control value is provided to the driving part so that the driving part outputs the driving current of the first intensity during the one time section in operation S930.

Also, in the obtaining S920, the second control value may be obtained by applying a predetermined ratio to the first control value.

In addition, in the providing S930, based on the identified first intensity being smaller than a threshold value, the driving part may be controlled based on the first control value and the second control value, and based on the identified first intensity being greater than or equal to the threshold value, the driving part may be controlled based on the first control value.

Further, in the identifying S910, the first intensity corresponding to the one time section may be identified based on at least one second bit which is the remaining one excluding a plurality of first bits among a plurality of bits indicating the grayscale value of the input image.

Here, in the identifying S910, a time section to which a driving current will be applied may be identified among the plurality of time sections based on the plurality of first bit values, and the number of the plurality of time sections may be determined based on the number of the plurality of first bits.

Also, in the identifying S910, the plurality of first bits may be identified based on the degrees of the plurality of respective bits.

In addition, in the providing S930, based on a driving current not being applied in the previous time section of the one time section and the first intensity of the driving current corresponding to the one time section being smaller than the threshold value, the driving part may be controlled based on the first control value and the second control value.

Meanwhile, the providing S930 may include operation(s) of a timing controller (TCON) outputting the first control value and the second control value based on the grayscale value of the input image, a driver IC outputting the driving current in an analog form based on the first control value and the second control value, and a pixel IC amplifying the driving current output from the driver IC, and outputting the amplified driving current to the backlight unit.

Here, in outputting the driving current to the backlight unit, the amplified driving current may be output in a held state.

Also, the control method may further include the providing the second control value to the pixel IC, and then outputting a gate control signal to the pixel IC before providing the first control value to the pixel IC.

According to the various embodiments of the disclosure as above, the electronic device can reduce the time for the backlight unit to reach the target brightness by applying the intensity of a driving current more strongly.

Also, as the time for the backlight unit to reach the target brightness is reduced, brightness according to PAM control can be distinguished more clearly.

Meanwhile, according to one or more embodiments of the disclosure, the aforementioned various embodiments may be implemented as software including instructions stored in machine-readable storage media, which can be read by machines (e.g.: computers). The machines refer to devices that call instructions stored in a storage medium, and can operate according to the called instructions, and the devices may include an electronic device according to the aforementioned embodiments (e.g.: an electronic device A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to one or more embodiments of the disclosure, a method according to the aforementioned various embodiments may be provided while being included in a computer program product. The computer program product can be traded between a seller and a purchaser as a commodity. The computer program product may be distributed in the form of a machine-readable storage medium (e.g.: a compact disc read only memory (CD-ROM)), or distributed online through an application store (e.g.: PLAYSTORE™). In the case of online distribution, at least a portion of the computer program product may be at least temporarily stored in a storage medium such as a server of a manufacturer, a server of an application store, or a memory of a relay server, or temporarily generated.

In addition, according to one or more embodiments of the disclosure, the aforementioned various embodiments may be implemented in a recording medium that can be read by a computer or a device similar to a computer, by using software, hardware, or a combination thereof. In some cases, the embodiments described in this specification may be implemented as a processor itself. According to implementation by software, the embodiments such as procedures and functions described in this specification may be implemented as separate software modules. Each of the software modules can perform one or more functions and operations described in this specification.

Meanwhile, computer instructions for performing processing operations according to the aforementioned various embodiments of the disclosure may be stored in a non-transitory computer-readable medium. Computer instructions stored in such a non-transitory computer-readable medium make the processing operations according to the aforementioned various embodiments performed by a specific machine, when the instructions are executed by the processor of the specific machine. A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disk, a blue-ray disk, a USB, a memory card, a ROM and the like.

Also, each of the components (e.g.: a module or a program) according to the various embodiments may consist of a singular object or a plurality of objects. Also, among the aforementioned corresponding sub components, some sub components may be omitted, or other sub components may be further included in the various embodiments. Alternatively or additionally, some components (e.g.: a module or a program) may be integrated as an object, and perform functions performed by each of the components before integration identically or in a similar manner. Further, operations performed by a module, a program, or other components according to the various embodiments may be executed sequentially, in parallel, repetitively, or heuristically. Or, at least some of the operations may be executed in a different order or omitted, or other operations may be added.

In addition, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. An electronic device comprising:
- a memory configured to store an image that is input;
- a backlight unit;
- a driving part configured to output a driving current to the backlight unit; and
- a processor configured to:
  - identify a first intensity of a driving current corresponding to one time section among a plurality of time sections of a backlight dimming section based on a grayscale value of the image input,
  - obtain a first control value that allows control of an intensity of the driving current based on the identified first intensity, and
  - provide a second control value, which is greater than the first control value to the driving part, that allows the driving part to output a driving current of a second intensity greater than the first intensity, and provide the first control value to the driving part that allows the driving part to output the driving current of the first intensity during the one time section among the plurality of time sections of the backlight dimming section.

2. The electronic device of claim 1, wherein the processor is configured to:
- obtain the second control value by applying a predetermined ratio to the first control value.

3. The electronic device of claim 1, wherein the processor is configured to:
- based on the identified first intensity being smaller than a threshold value, control the driving part based on the first control value and the second control value, and
- based on the identified first intensity being greater than or equal to the threshold value, control the driving part based on the first control value.

4. The electronic device of claim 1, wherein the processor is configured to:
- identify the first intensity corresponding to the one time section based on at least one second bit which remains subsequent to excluding a plurality of first bits among a plurality of bits indicating the grayscale value of the image.

5. The electronic device of claim 4, wherein the processor is configured to:
- identify a time section to which a driving current is to be applied among the plurality of time sections based on the plurality of first bit values, and
- a number of the plurality of time sections is determined based on a number of the plurality of first bits.

6. The electronic device of claim 4, wherein the processor is configured to:
- identify the plurality of first bits based on degrees of the plurality of first bits, respectively.

7. The electronic device of claim 4, wherein the processor is configured to:
- based on a driving current not being applied in a previous time section of the one time section and the first intensity of the driving current corresponding to the one time section being smaller than a threshold value, control the driving part based on the first control value and the second control value.

8. The electronic device of claim 1, wherein the processor comprises:
- a timing controller (TCON) configured to output the first control value and the second control value based on the grayscale value of the image, and
- the driving part comprises:
  - a driver IC configured to output the driving current in an analog form based on the first control value and the second control value; and
  - a pixel IC configured to amplify the driving current output from the driver IC, and output the amplified driving current to the backlight unit.

9. The electronic device of claim 8, wherein the pixel IC is configured to:
- output the amplified driving current in a held state.

10. The electronic device of claim 8, wherein the driver IC is configured to:
- provide the second control value to the pixel IC, and output a gate control signal to the pixel IC before providing the first control value to the pixel IC.

11. A control method for an electronic device, the control method comprising:
- identifying a first intensity of a driving current corresponding to one time section among a plurality of time sections of a backlight dimming section based on a grayscale value of an image that is input;
- obtaining a first control value that allows control of an intensity of the driving current based on the identified first intensity; and
- providing a second control value, which is greater than the first control value, to a driving part, that allows the driving part to output a driving current to a backlight unit of the electronic device, output a driving current of a second intensity greater than the first intensity and provide the first control value to the driving part so that the driving part outputs the driving current of the first intensity during the one time section among the plurality of time sections of the backlight dimming section.

12. The control method of claim 11, wherein the obtaining comprises:
- obtaining the second control value by applying a predetermined ratio to the first control value.

13. The control method of claim 11, wherein the providing comprises:
- based on the identified first intensity being smaller than a threshold value, controlling the driving part based on the first control value and the second control value; and based on the identified first intensity being greater than or equal to the threshold value, controlling the driving part based on the first control value.

14. The control method of claim 11, wherein the identifying comprises:

identifying the first intensity corresponding to the one time section based on at least one second bit which remains subsequent to excluding a plurality of first bits among a plurality of bits indicating the grayscale value of the image.

15. The control method of claim 14, wherein the identifying comprises:

identifying a time section to which a driving current is to be applied among the plurality of time sections based on the plurality of first bit values, and a number of the plurality of time sections is determined based on a number of the plurality of first bits.

* * * * *